(12) United States Patent
Schulte et al.

(10) Patent No.: US 7,743,084 B2
(45) Date of Patent: Jun. 22, 2010

(54) PROCESSING UNIT HAVING MULTIOPERAND DECIMAL ADDITION

(75) Inventors: Michael J. Schulte, Madison, WI (US); Robert D. Kenney, Middleton, WI (US)

(73) Assignee: Wisconsin Alumni Research Foundation, Madison, WI (US)

(*) Notice: Subject to any disclaimer, the term of this patent is extended or adjusted under 35 U.S.C. 154(b) by 1585 days.

(21) Appl. No.: 11/014,674

(22) Filed: Dec. 16, 2004

(65) Prior Publication Data
US 2006/0064455 A1    Mar. 23, 2006

Related U.S. Application Data

(60) Provisional application No. 60/612,421, filed on Sep. 23, 2004.

(51) Int. Cl.
*G06F 7/50* (2006.01)
(52) U.S. Cl. .................. 708/670; 708/700; 708/708
(58) Field of Classification Search .......... 708/670–714
See application file for complete search history.

(56) References Cited

U.S. PATENT DOCUMENTS

| | | | |
|---|---|---|---|
| 3,991,307 A * | 11/1976 | Peddle et al. ............... 708/190 |
| 4,118,786 A * | 10/1978 | Levine et al. ............... 708/685 |
| 4,138,731 A * | 2/1979 | Kamimoto et al. .......... 708/685 |
| 4,172,288 A | 10/1979 | Anderson |
| 4,276,596 A | 6/1981 | Flynn et al. |
| 4,488,252 A | 12/1984 | Vassar |
| 4,677,583 A | 6/1987 | Ohtsuki et al. |
| 4,805,131 A | 2/1989 | Adiletta et al. |
| 4,839,850 A * | 6/1989 | Noll et al. .................... 708/709 |
| 4,864,527 A | 9/1989 | Peng et al. |
| 4,866,656 A | 9/1989 | Hwang |
| 5,007,010 A * | 4/1991 | Flora ........................... 708/673 |
| 5,027,308 A | 6/1991 | Sit et al. |
| 5,424,968 A | 6/1995 | Okamoto |
| 5,732,007 A | 3/1998 | Grushin et al. |
| 5,745,399 A | 4/1998 | Eaton et al. |
| 5,808,926 A | 9/1998 | Gorshtein et al. |
| 5,928,319 A | 7/1999 | Haller et al. |
| 5,931,896 A | 8/1999 | Kawaguchi |

(Continued)

OTHER PUBLICATIONS

Martin S. Schmookler et al., "High Speed Decimal Addition," *IEEE Transactions on Computers*, vol. C-20, No. 8, pp. 862-866, Aug. 1971.

(Continued)

*Primary Examiner*—Lewis A Bullock, Jr.
*Assistant Examiner*—Michael Yaary
(74) *Attorney, Agent, or Firm*—Shumaker & Sieffert, P.A.

(57) ABSTRACT

A multi-operand decimal adder is described that performs addition on multiple binary coded decimal (BCD) operands. The multi-operand decimal adder uses binary carry-save adders to produce intermediate sums and carries, and outputs a decimal result based on the intermediate sums and carries. In various configurations, the multi-operand decimal adder may perform speculative or non-speculative binary carry-save addition. The multioperand decimal adders achieve a reasonable critical path. As a result, the decimal adders and the techniques described herein may be especially suited for numerically intensive commercial applications, such as spreadsheet or financial applications where large amounts of decimal data typically need to be processed quickly.

33 Claims, 12 Drawing Sheets

U.S. PATENT DOCUMENTS

| | | | |
|---|---|---|---|
| 6,148,316 | A | 11/2000 | Herbert et al. |
| 6,292,819 | B1 | 9/2001 | Bultmann et al. |
| 6,546,411 | B1 | 4/2003 | Singh |
| 7,299,254 | B2 * | 11/2007 | Alagarsamy et al. ........ 708/685 |
| 2001/0051969 | A1 | 12/2001 | Oberman |
| 2002/0129075 | A1 | 9/2002 | Park et al. |
| 2002/0133525 | A1 | 9/2002 | Chen et al. |
| 2003/0055859 | A1 | 3/2003 | Seidel et al. |
| 2003/0101207 | A1 | 5/2003 | Dhong et al. |

OTHER PUBLICATIONS

Mark A. Erle et al., "Decimal Multiplication Via Carry-Save Addition," *IEEE 14$^{th}$ International Conference on Application-Specific Systems, Architectures and Processors*, 11 pages, 2003.

Behrooz Shirazi et al., "RBCD: Redundant Binary Coded Decimal Adder," *IEEE Proceedings*, vol. 136, Part E, No. 2, pp. 156-160, Mar. 1989.

Behrooz Shirazi et al., "VLSI Designs for Redundant Binary-Coded Decimal Addition," *Proceedings of the 7th Annual International Conference on Computers and Communications*, pp. 52-56, Mar. 1988.

Robert D. Kenney et al., "Multioperand Decimal Addition," *Proceedings of the IEEE Computer Society Annual Symposium on VLSI*, 10 pages, Feb. 2004.

Draft Standard for Floating-Point Arithmetic P754/D0.10.9, http://754r.ucbtest.org/drafts/754r.pdf, IEEE, 136 pages, Apr. 6, 2005.

U.S. Appl. No. 10/941,645, filed Sep. 15, 2004, entitled "Decimal Floating-Point Adder."

Office Action dated Jun. 16, 2008, for U.S. Appl. No. 10/941,645, (6 pages).

Cowlishaw, "Decimal Floating-Point:Algorism for Computers", Proceedings of the 16$^{th}$ Symposium on Computer Arithmetic (ARITH'03), 2003 IEEE, (8 pages).

Logan, "What Is Scientific Notation and How Is It Used?", © 1995, Revised Jul. 11, 2001, http://members.aol.com/profchm/sci_not.html, printed on Apr. 2, 2008, (9 pages).

Cowlishaw et al., "A Decimal Floating-Point Specification", pp. 147-154, 2001 IEEE.

Thompson et al., "A 64-bit Decimal Floating-Point Adder", Proceedings of the IEEE Computer Society Annual Symposium on VLSI Emerging Trends in VLSI Systems Design (ISVLSI'04), 2004, IEEE, (2 pages).

Office Action dated Nov. 18, 2008, for U.S. Appl. No. 10/941,645, (4 pages).

\* cited by examiner

DELAY FOR 4-BIT MULTIOPERAND ADDERS

AREA FOR 4-BIT MULTIOPERAND ADDERS

US 7,743,084 B2

PROCESSING UNIT HAVING MULTIOPERAND DECIMAL ADDITION

This application claims the benefit of U.S. Provisional Application Ser. No. 60/612,421, filed Sep. 23, 2004, the entire content of which is incorporated herein by reference.

TECHNICAL FIELD

The invention relates to computing devices and, more particularly, to techniques for performing arithmetic operations within computing devices.

BACKGROUND

Although most people use decimal arithmetic when performing manual calculations, computers typically only support binary arithmetic in hardware. This is primarily due to the fact that modern computers typically only represent two logic values: zero and one. While it is possible to use these two logic values to represent decimal numbers, doing so is wasteful in terms of storage space and often computationally less efficient. For example, in binary, four bits can represent sixteen values; while in binary coded decimal (BCD), four bits only represent ten values. Since most computer systems do not provide hardware support for decimal arithmetic, numbers are typically inputted in decimal, converted from decimal to binary, processed using binary arithmetic and then converted back to decimal for output.

In spite of the current dominance of hardware support for binary arithmetic, there are several motivations that encourage the provision of support for decimal arithmetic. First, applications that deal with financial and other real-world data often introduce errors since many common decimal numbers cannot be represented exactly in binary. For example, the decimal number "0.1" is a repeating fraction when represented in binary. Second, people typically think about computations in decimal, even when using computers that operate only on binary representations, and therefore may experience what is perceived as incorrect behavior when processing decimal values. Third, converting between binary and decimal numbers is computationally intensive. For example, conversion on modern processors may take thousands of processing cycles.

In an effort to alleviate some of the problems that occur when a computer only supports binary arithmetic in hardware, several software packages and programming language extensions for decimal arithmetic have been developed. Although some of these packages are successful in eliminating binary-to-decimal and decimal-to-binary conversion errors, the packages are often hundreds to thousands of times slower than binary operations implemented in hardware.

One conventional method of performing decimal addition is to add two decimal operands to produce a BCD sum. If the sum is greater than nine, a correction value of six is added to the sum. Adding six skips the invalid bit patterns and yields the correct BCD sum digit and a carry-out of the digit. For example, to compute 7+7=14 in BCD, the two sevens are added to produce 1110 binary. Since this sum is greater than 9, a correction of 6 (0110 binary) is added, which yields a carry-out of 1 and a sum of 0100. The carry-out of 1 yields the next decimal digit of the sum. For example, the produced sum, 0001 0100, is the BCD representation of 14.

Adding two BCD operands in this manner is a computationally slow process. One technique used to improve the performance of two operand BCD addition is to speculate that the sum for each pair of digits will be greater than nine. This is done by speculatively adding six along with the original operands. The advantage of this approach is that the correct carries between digits are generated during the first addition. The digits of the resulting sums need to be corrected by subtracting six if the carryout for that digit is zero. The final correction is subtracted using only digit-wide subtractions because all sums are guaranteed to be at least six.

SUMMARY

In general, the invention is directed to various techniques for high-speed, multiple-operand (multioperand) decimal addition and, more particularly, multioperand decimal addition using binary carry-save addition (CSA). For example, three techniques using speculative binary to binary coded decimal (BCD) correction are described. A non-speculative technique is also described.

In one embodiment, a method comprises receiving at least three decimal operands with a decimal adder of a processing unit, and performing binary carry-save addition with the decimal multioperand adder to produce a set of sum bits and a set of carry bits. The method further comprises outputting a decimal result based on the set of sum bits and the set of carry bits.

In another embodiment, a processing unit comprises a multioperand decimal adder that receives at least three decimal operands and performs binary carry-save addition and correction on the operands to produce a decimal result.

In another embodiment, a method comprises (a) receiving at least three decimal operands with a decimal multioperand adder of a processing unit, and (b) adding a digit of a first one of the operands with a digit of a second one of the operands with a first binary carry-save adder to produce an intermediate sum and an intermediate carry. The method further comprises (c) adding a digit of a third one of the operands with a correction value in parallel with step (b) to produce a corrected version of the third one of the operands, and (d) selectively adding either the third one of the operands or the corrected version to the intermediate sum of step (b) with a second binary carry-save adder based on the intermediate carry from step (b).

In another embodiment, a multioperand decimal adder comprises a plurality of inputs to receive a plurality of decimal operands, and a first binary carry-save adder that adds a digit of a first one of the operands with a digit of a second one of the operands to produce a first intermediate sum and a first intermediate carry. The multioperand decimal adder further comprises correction logic in parallel the first binary carry-save adder to produce a corrected version of a third operand, a multiplexer to selectively output either the third one of the operands or the corrected version of the third operand based on the first intermediate carry; and a second binary carry-save adder to add the first intermediate sum and the first intermediate carry with the output of the multiplexer.

In another embodiment, a method comprises (a) receiving at least four decimal operands with a decimal adder of a processing unit, and (b) adding a digit of a first one of the operands with a digit of a second one of the operands with a first binary carry-save adder to produce an intermediate sum S1 and an intermediate carry C1. The method further comprises (c) adding the intermediate sum S1 and the intermediate carry C1 with a digit of a third one of the operands with a second binary carry-save adder to produce an intermediate sum S2 and an intermediate carry C2, (d) adding a digit of a fourth one of the operands with a correction value in parallel with steps (b) and (d) to produce a corrected version of the fourth one of the operands, and (e) selectively adding either the fourth one of the operands or the corrected version to the intermediate sum S2 and the intermediate carry C2 with a third binary carry-save adder based on the intermediate carry C2.

In another embodiment, a multioperand decimal adder comprises a plurality of inputs to receive a plurality of decimal operands, a first binary carry-save adder that adds a digit of a first one of the operands with a digit of a second one of the operands to produce a first intermediate sum S1 and a first intermediate carry C1, and a second binary carry-save adder that adds the intermediate sum S1 and the first intermediate carry C1 with a digit of a third one of the operands to produce a second intermediate sum S2 and a second intermediate carry C2. The multioperand decimal adder further comprises correction logic in parallel the first binary carry-save adder and the second binary carry-save adder that outputs a corrected version of a fourth operand, a multiplexer to selectively output either the fourth one of the operands or the corrected version of the fourth operand based on the second intermediate carry C2, and a third binary carry-save adder to add the output from the multiplexer with the second intermediate sum S2 and the second intermediate carry C2 based on a logical value of the second intermediate carry C2.

In another embodiment, a method comprises (a) receiving a plurality of decimal operands with a decimal adder of a processing unit, and (b) adding a first subset of the operands with a first binary speculative adder to produce an intermediate sum S0 and an intermediate carry C0. The method further comprises (c) adding a second subset of the operands with a second binary speculative adder in parallel with step (b) to produce an intermediate sum S1 and an intermediate carry C1, and (d) outputting a decimal result based on the intermediate sums S0 and S1 and the intermediate carries C0 and C1.

In another embodiment, a multioperand decimal adder comprises a plurality of inputs to receive a plurality of decimal operands, and a first speculative adder to add a first subset of the operands to produce a first inter intermediate sum S1. The multioperand decimal adder further comprises a second speculative adder in parallel with the first speculative adder to add a second subset of the operands to produce a second intermediate sum S2, and at least one decimal carry propagate adder to output the decimal result as a function of the intermediate sums S1 and S2.

In another embodiment, a method comprises receiving a plurality of decimal operands with a decimal adder of a processing unit, wherein the decimal adder includes a carry-save adder tree having a plurality of carry-save adders. The method further comprises adding the operands using a carry-save adder tree to produce an intermediate binary sum and a plurality of carries, and producing a decimal result based on the intermediate sum and a correction value selected based on the intermediate carries.

In another embodiment, a multioperand decimal adder comprises a plurality of inputs to receive a plurality of decimal operands, and a carry-save adder tree having a plurality of carry-save adders that perform non-speculative binary addition to produce an intermediate binary sum and a plurality of carries. The multioperand decimal adder further comprises at least one decimal carry propagate adder to output the decimal result as a function of the intermediate binary sum and the plurality of carries.

The technique may provide one or more advantages. For example, the multioperand decimal adders described herein may be used in a processing unit to provide fast and efficient decimal addition or subtraction of multiple operands. In addition, the multioperand decimal adders may be utilized in the implementation of fast decimal multipliers and dividers. The multioperand decimal adder may also be useful in spreadsheet or other applications where large amounts of decimal data typically need to be processed quickly. Moreover, embodiments of the described multioperand decimal adders achieve a reasonable critical path delay. As a result, the decimal adders and the techniques described herein may be especially suited for numerically intensive commercial applications.

The details of one or more embodiments of the invention are set fourth in the accompanying drawings and the description below. Other features, objects, and advantages of the invention will be apparent from the description and drawings, and from the claims.

DETAILED DESCRIPTION

Figure 1:
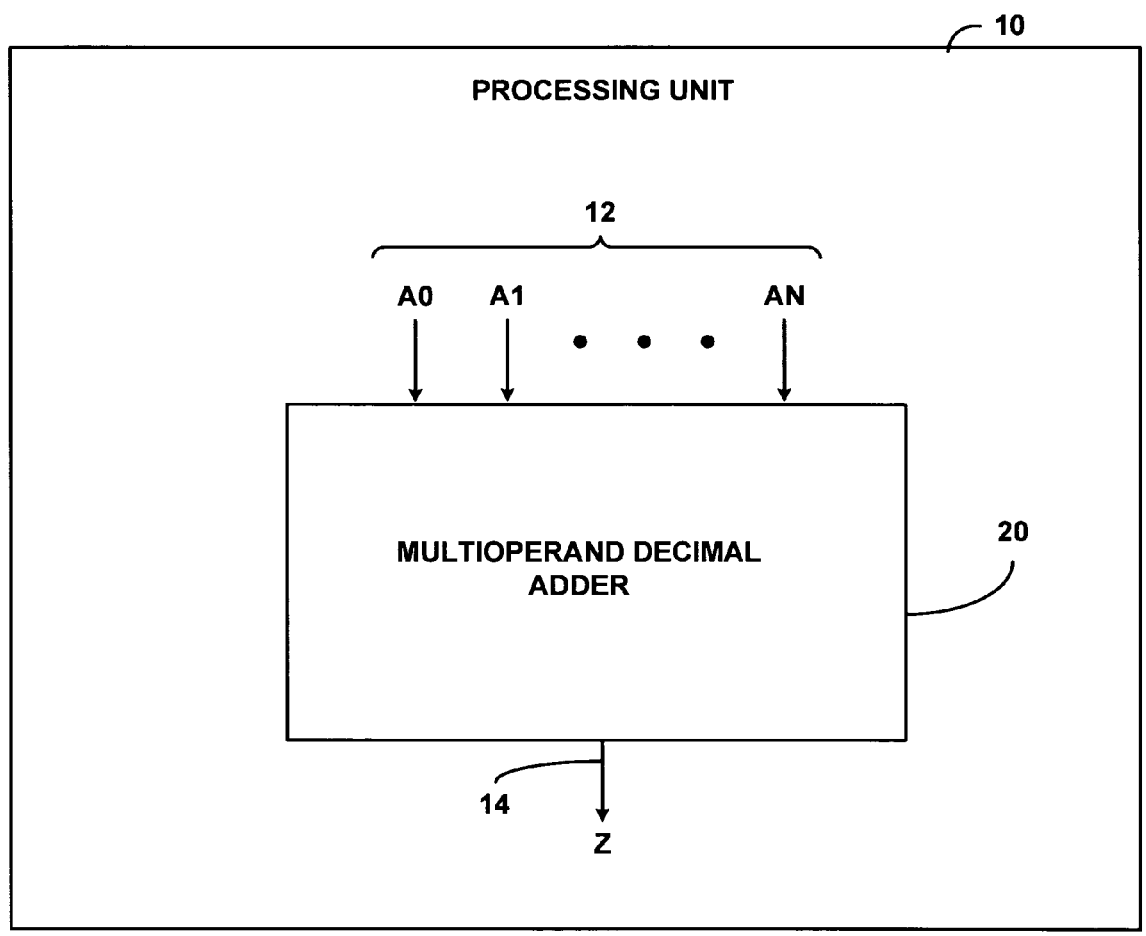
FIG. 1 is a block diagram illustrating a processing unit that performs decimal arithmetic in accordance with the invention.

FIG. 1 is a block diagram illustrating an example embodiment of a processing unit 10 that performs multioperand decimal arithmetic in accordance with one or more of the techniques described herein. In particular, FIG. 1 illustrates a portion of processing unit 10 that includes a multioperand decimal adder 20 for performing decimal arithmetic. Multioperand decimal adder 20 receives binary coded decimal (BCD) inputs 12 labeled "A0-A(N−1)." Each BCD operand, e.g., A0, of BCD operands 12 comprises a BCD digit. Multioperand decimal adder 20 sums BCD operands 12 using binary carry-save addition to produce a BCD sum 14, "Z." For example, let BCD operands 12 comprise exactly three double-digit inputs, wherein A0=19 (decimal)=0001 1001 (BCD), A1=28=0010 1000 and A2=86=1000 0110. Multioperand decimal adder would produce a BCD sum Z of 0001 0011 0011, which is 133 in BCD format.

In various embodiments described herein, multioperand decimal adder 20 one of four techniques described herein for performing fast decimal addition on BCD operands 12. As further described below, three of the techniques speculate BCD correction values and use chaining to correct intermediate results. The first technique speculates over one addition. The second technique speculates over two additions. The third technique employs multiple instances of the second technique in parallel and then merges the results. The fourth technique uses a binary carry-save adder tree and produces a binary sum. Combinational logic is then used to correct the sum and determine the carry into the next digit.

Multioperand decimal adder 20 uses binary carry-save addition (CSA). In different embodiments, multioperand decimal adder 20 may speculate binary to BCD correction values, in which case a speculation correction is required to produce BCD sum 14. In other embodiments, multioperand decimal adder 20 may comprise one or more non-speculative decimal adders.

Processing unit 10 may be a microprocessor or coprocessor for use within a laptop computer, general-purpose computer or high-end computing system. Alternatively, processing unit 10 may be a microcontroller, application-specific integrated circuit (ASIC) or other component. Moreover, processing unit 10 may be implemented as a single integrated circuit in which adder 20 constitutes only a portion of the implemented functionality. Alternatively, adder 20 may be implemented in one or more stand-alone integrated circuits. Further, components of processing unit 10 and adder 20 may be implemented as discrete combinatorial logic, logic arrays, microcode, firmware or combinations thereof.

Figure 2:
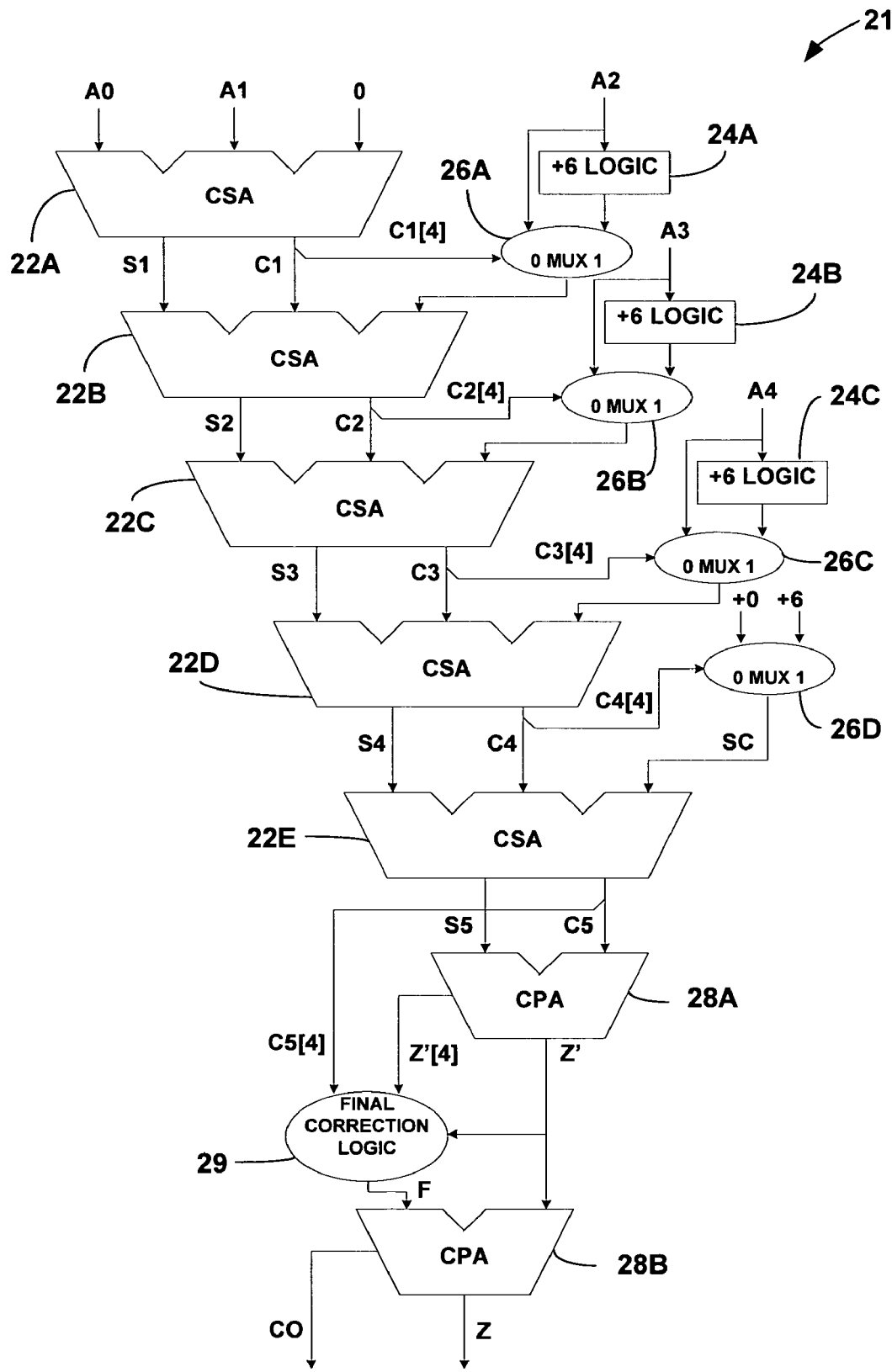
FIG. 2 is a block diagram illustrating a single-digit multioperand decimal adder, which uses single correction speculation according to an embodiment of the invention.

FIG. 2 is a block diagram illustrating a single-digit multioperand decimal adder 21 (herein, "adder 21") that uses speculative binary to BCD correction according to one embodiment of the invention. In the illustrated embodiment, adder 21 includes binary carry-save adders 22A, 22B, 22C, 22D and 22E (collectively, "CSAs 22"). Adder 21 also includes speculative binary to BCD correction logic 24A, 24B and 24C (collectively, "logic 24") and multiplexers 26A, 26B, 26C and 26D (collectively, "multiplexers 26"). Lastly, adder 21 includes carry propagate adders 28A and 28B (collectively, "CPAs 28") and final correction logic 29.

In this description, a digit referenced with brackets (e.g. A1[3]) denotes a single bit of that digit. With respect to FIG. 2, CSAs 22 each output a sum S digit and a carry C digit. Each carry digit is a 4-bit quantity having bit positions [4:1].

Adder 21 applies single correction speculation. With single correction speculation, BCD digits from the first two input operands, A0 and A1, are added using binary carry-save addition by CSA 22A to produce a 4-bit sum digit, S1, and a 4-bit carry digit, C1, such that S1+C1=A0+A1. When performing word-wide decimal multioperand addition, i.e. adding operands having more than one BCD digit, bit position C[0] is set to the carry-out from the previous, less-significant, carry digit and bit position C[4] is passed to the least significant bit of the next more significant carry digit.

If the most significant bit of the first carry digit, C1[4], is equal to one, then a carry-out of the current digit has occurred and the sum of the first two input operands is at least sixteen and a correction value of six needs to be added. To keep the addition of the correction value off the critical delay path, the correction value for the sum of A0 and A1 is added in advance to the BCD digit of the next input operand, i.e., operand A2, by logic 24A. C1[4] is used by multiplexer 26A to selected the next value to be added by CSA 22B, i.e., either operand A2 or operand A2+6. When C1[4] equals zero, i.e., no carry occurs, multiplexer 26A selects operand A2. When C1[4] equals one, indicating a carry out has occurred, multiplexer 26A selects operand A2+6.

A similar advanced correction process continues for operands A3 and A4, which are added by CSAs 22C and 22D with appropriate correction values selected by multiplexers 26B and 26C. For each level of adder 21, the most significant bit of the carry digit C in the previous level is examined. For example, if C2[4] is 1, then a carry-out of that level has occurred and A3+6 is selected by multiplexer 26B for addition to S2 and C2 by CSA 22C to produce S3+C3=S2+C2+ (A3+6). Otherwise, if C2[4] is 0, no correction is needed, and A3 is added to S2 and C2 to produce S3+C3=S2+C2+A3.

Next, a speculation correction value, SC, is added to S4 and C4 based on C4[4] by CSA 22E. In particular, when C4[4]=0, no correction value is needed, i.e., SC=0 If, however, C4[4]=1, a correction value of SC=6 is used.

A 1-digit carry-propagate addition is then performed by CPA 28A to compress the sum and carry digitis to obtain an intermediate BCD digit Z'=S5+C5. Last, the final sum is corrected back to a valid BCD digit, Z, by final correction logic 29 and CPA 28B, and a digit carry, CO, is produced.

Table 1 illustrates a final correction value F output by final correction logic 29 based on C5[4], Z'[4], and Z'. Correction value F ensures the final digit, Z, is a valid BCD digit in the range of 0 to 9. Since each addition has been corrected by adding six whenever there is a carry-out of the current digit position, the final correction, F, is either 0, 6, or 12, based on the values of C5[4], Z'[4], and Z', as shown in Table 1.

TABLE 1

| C5[4] | Z'[4] | Z' | F |
|-------|-------|------|------|
| 0 | 0 | <10 | 0x0 |
| 0 | 0 | >=10 | 0x6 |
| 0 | 1 | <10 | 0x6 |
| 0 | 1 | >=10 | 0xc |
| 1 | 0 | <10 | 0x6 |
| 1 | 0 | >=10 | 0xc |
| 1 | 1 | <10 | 0xc |
| 1 | 1 | >=10 | N/A |

In the illustrated embodiment of FIG. 2, adder 21 receives five single-digit operands and quickly produces a single BCD sum digit Z and a digit carry CO. However, more or less levels may similarly be used to implement a single correction speculation multioperand decimal adder capable of receiving more or less than five operands.

Moreover, as illustrated below in reference to FIG. 8, adder 21 may comprise multiple 1-digit single correction speculation adders and a word-wide decimal carry-propagate adder (CPA) to add multiple digit BCD operands. In word-wide decimal multioperand addition, Z represents the correct BCD digit having the same significance as the input operands and CO would be passed along to be included in the calculation of the next most significant digit of the total sum.

Figure 3:
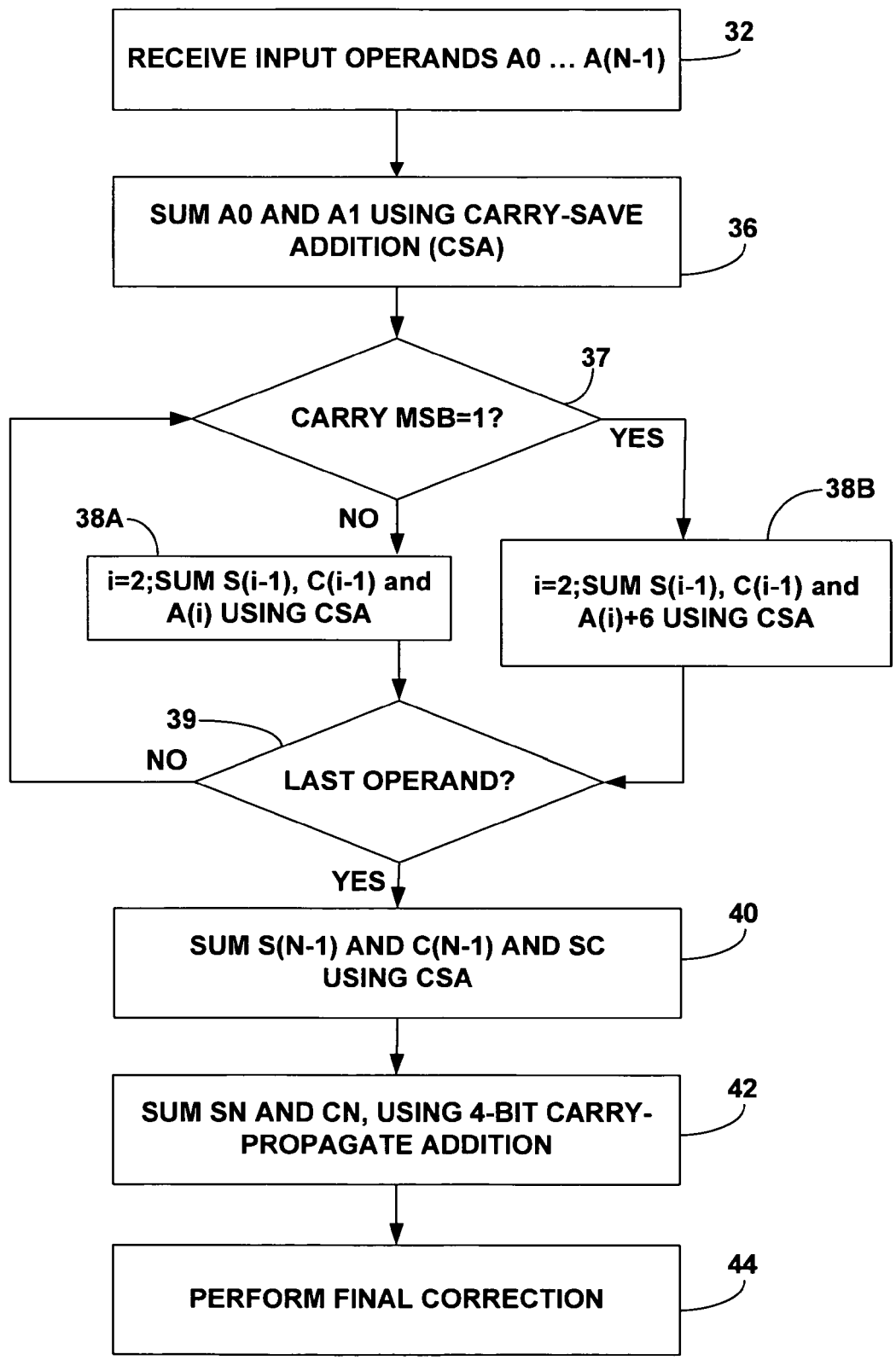
FIG. 3 is a flowchart illustrating exemplary operation of a multioperand decimal adder that performs decimal arithmetic using single correction speculation in accordance with the invention.

FIG. 3 is a flowchart illustrating exemplary operation of a multioperand decimal adder, such as adder 21 of FIG. 2, that performs decimal arithmetic using single correction speculation in accordance with the techniques described herein. Initially, adder 21 receives at least three operands (32). Next, adder 21 sums the first operand, or a single BCD digit from the first operand if the first operand has more than one BCD digit, A0, with the second operand, A1, using binary carry-save addition (36). This produces a 4-bit sum S1, and a 4-bit carry C1. If the most significant bit of the carry is 0, then S1, C1 and A2 are summed using a carry-save adder to produce S2 and C2 (38A). If instead the most significant bit of carry is 1, then S1, C1, and (A2+6) are summed using a carry-save adder to produce S2 and C2 (38B).

A similar process continues for N−2 iterations (2≦i<N), until all input operands: A0, A1, . . . A(N−1), are added with appropriate correction values. For each iteration, the most significant bit of the carry digit in the previous iteration, C(i−1)[4], is examined (37). If C(i−1)[4] is one, then a carry-out of the current digit has occurred and A(i)+6 is added to S(i−1) and C(i−1) using carry-save addition (38B) to produce S(i)+C(i)=S(i−1)+C(i−1)+(A(i)+6). Otherwise, no correction is needed and A(i) is added to S(i−1) and C(i−1) using carry-save addition (38A) to produce S(i)+C(i)=S(i−1)+C(i−1)+A(i).

Once the last operand A(N−1) has been added (39), a final speculation correction is required. Specifically, a speculation correction value SC is added to S(N−1) and C(N−1) based on C(N−1)[4] to produce SN and CN (40). Then, a 1-digit carry-propagate addition is performed to compress the sum, SN, and carry, CN, to obtain Z' =SN+CN using 4-bit carry-propagate addition (42). Last, the final sum Z' is corrected back to a valid BCD digit, Z, and a digit carry, CO, is also produced (44). For illustrative purposes, the following pseudo code also illustrates the single correction speculation algorithm performed by adder 21:

```
S1 + C1 = A0 + A1 + 0;              // using carry save addition
for (i = 2; i <N; i++)              // for each of the remaining operands
    if (C(i−1)[4]==1)  S(i) + C(i) = S(i−1) + C(i−1) + (A(i) + 6);
    else               S(i) + C(i) = S(i−1) + C(i−1) + (A(i) + 0);
SN + CN = S(N−1) + C(N−1) +         // speculation correction
SC;
Z' = SN +CN;                        // 4-bit carry-propagate addition
{CO, Z} = Z' + F;                   // F is the final correction from Table 1
```

Figure 4:
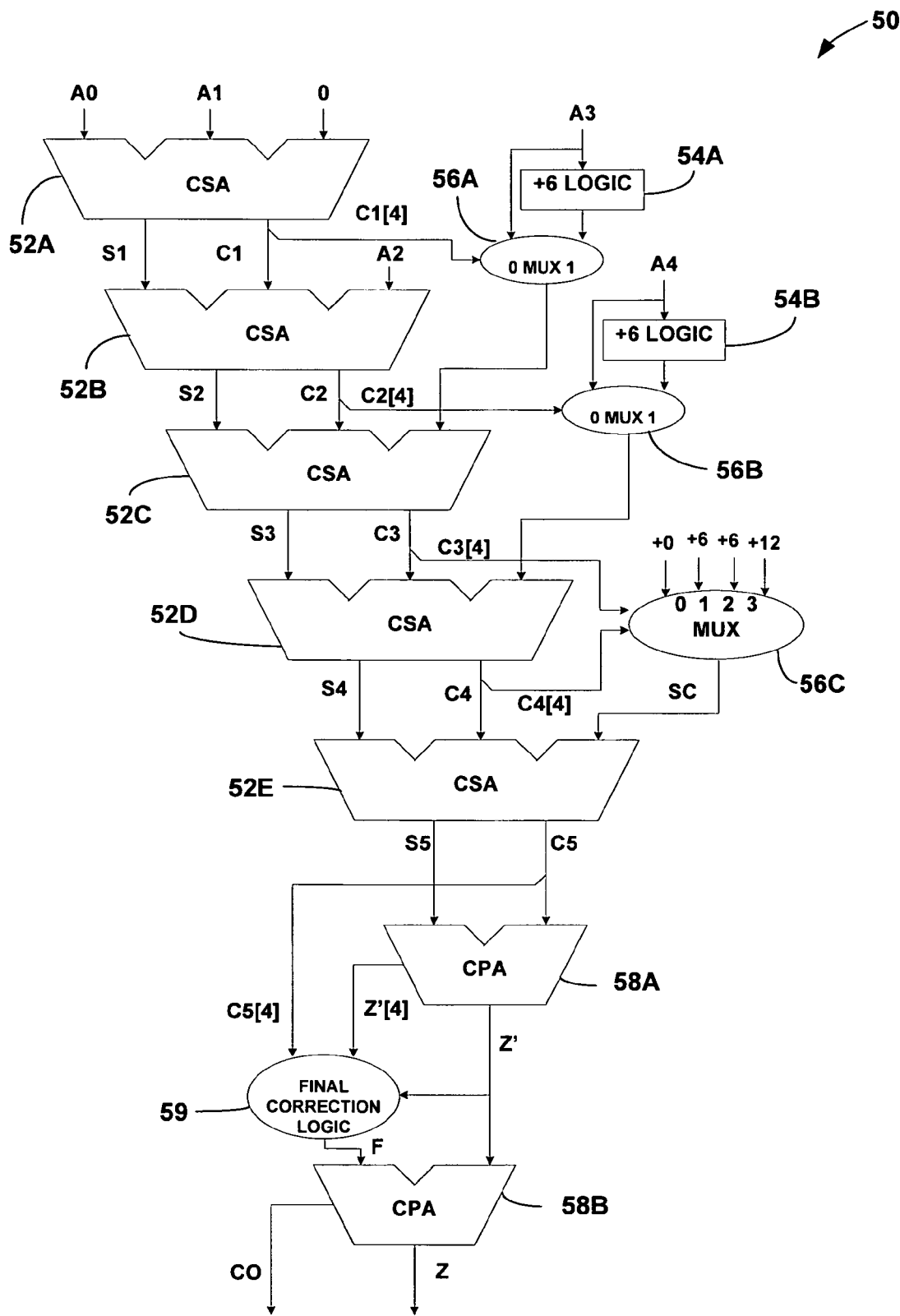
FIG. 4 is a block diagram illustrating a single-digit multioperand adder, which uses double correction speculation according to an embodiment of the invention.

FIG. 4 is a block diagram illustrating an exemplary multioperand decimal adder 50 (herein, "adder 50") that uses double correction speculation according to an embodiment of the invention. As illustrated, adder 50 includes carry-save adders 52A, 52B, 52C, 52D and 52E (collectively, "CSAs 52"). Adder 50 also includes speculative binary to BCD correction logic 54A and 54B (collectively, "logic 54") and multiplexers 56A, 56B and 56C (collectively, "multiplexers 56"). Lastly, adder 50 includes carry propagate adders 58A and 58B (collectively, "CPAs 58") and final correction logic 59.

With double correction speculation, BCD digits from the first two input operands, A0 and A1, are added using binary carry-save addition by CSA 52A to produce a 4-bit sum digit, S1, and a 4-bit carry digit, C1, such that S1+C1=A0+A1. Then, the next input operand, A2, is added with S1 and C1 by CSA 52B such that S2+C2=S1+C1+A2.

If the most significant bit of the first carry digit, C1[4], is equal to one, then a carry-out of the CSA 52A has occurred and a correction value of six needs to be added. To keep the addition of the correction value off the critical delay path, the correction value is added in advance to the digit of input operand A3 by logic 54A. Moreover, by adding the correction to A3 instead of A2, as with adder 21, multiplexer 56A is also kept off the critical path as the selection process occurs in parallel with the addition operation of CSA 52B. The same process continues for A4, which is added by CSA 52D to S3 and C3 with an appropriate correction selected by multiplexer 56B.

At the end of the process, multiplexer 56C selects a speculation correction value, SC, which is added to S4 and C4 based on C4[4] and C3[4] by CSA 52E. Next, a carry-propagate addition is performed by CPA 58A to compress the sum and carry digits to obtain Z'=S5sum Z' is corrected back to a valid BCD digit, Z and a digit carry CO by final correction logic 59 and CPA 58B.

As with adder 21 of FIG. 2, adder 50 speculates that the addition of A0 with A1 does not need to be corrected. Adder 50 also speculates that the addition of A2 with S1 and C1 does not need to be corrected. Using double correction speculation, logic 54 uses C(i−2)[4] to select whether A(i) or A(i)+6 is added to S(i−1) and C(i−1). Compared with adder 21 of FIG. 2, which uses single correction speculation, this removes the multiplexers 56 that select between A(i) and A(i)+6 from the critical path, since the correction for A(i+1) is selected while the carry-save addition of A(i) or A(i)+6 with S(i−1) and C(i−1) is being performed. It also removes the logic to produce A2+6, since A2 is always added without a correction value. However, determination of the speculation correction value, SC, is slightly more complex with adder 50 than adder 21 because double correction speculation requires two speculative additions whereas single correction speculation only requires one. Final correction logic 59 selects a value of 0, 6, or 12 for speculation correction SC based on C(N−2)[4] and C(N−1)[4] as shown in Table 2.

TABLE 2

| C(N − 2)[4] | C(N − 1)[4] | SC |
|---|---|---|
| 0 | 0 | 0000 (+0) |
| 0 | 1 | 0110 (+6) |
| 1 | 0 | 0110 (+6) |
| 1 | 1 | 1100 (+12) |

For ease of illustration, adder 50 of FIG. 4 is shown to receive five operands A0-A4. In this embodiment, adder 50 utilizes five 4-bit carry-save adders 52, two 4-bit 2:1 multiplexers 56A adn 56B, two combinational logic blocks 54 to find A(i)+6, one 4-bit 4:1 multiplexer 56C to produce SC, two 4-bit carry-propagate adders 58, and one 4-level combinational logic block 59 to produce the final correction, F. In this configuration, the critical delay path of adder consists of five carry-save additions, one 4-bit 4:1 multiplexer delay, two 4-bit carry propagate additions, and 4-levels of logic to implement Table 2. Compared to the single correction speculation Adder 21 in FIG. 2, the double correction speculation adder 50 removes three 4-bit 2:1 multiplexers from the critical delay path.

In accordance with other embodiments of the invention, the techniques shown in FIG. 4 may be utilized to implement a double correction speculation decimal adder capable of receiving and adding more or less than five decimal operands. Further, a processing unit may comprise multiple 1-digit double correction speculation adders 50 and a word-wide decimal carry-propagate adder (CPA) for operation on multiple digit BCD operands.

Figure 5:
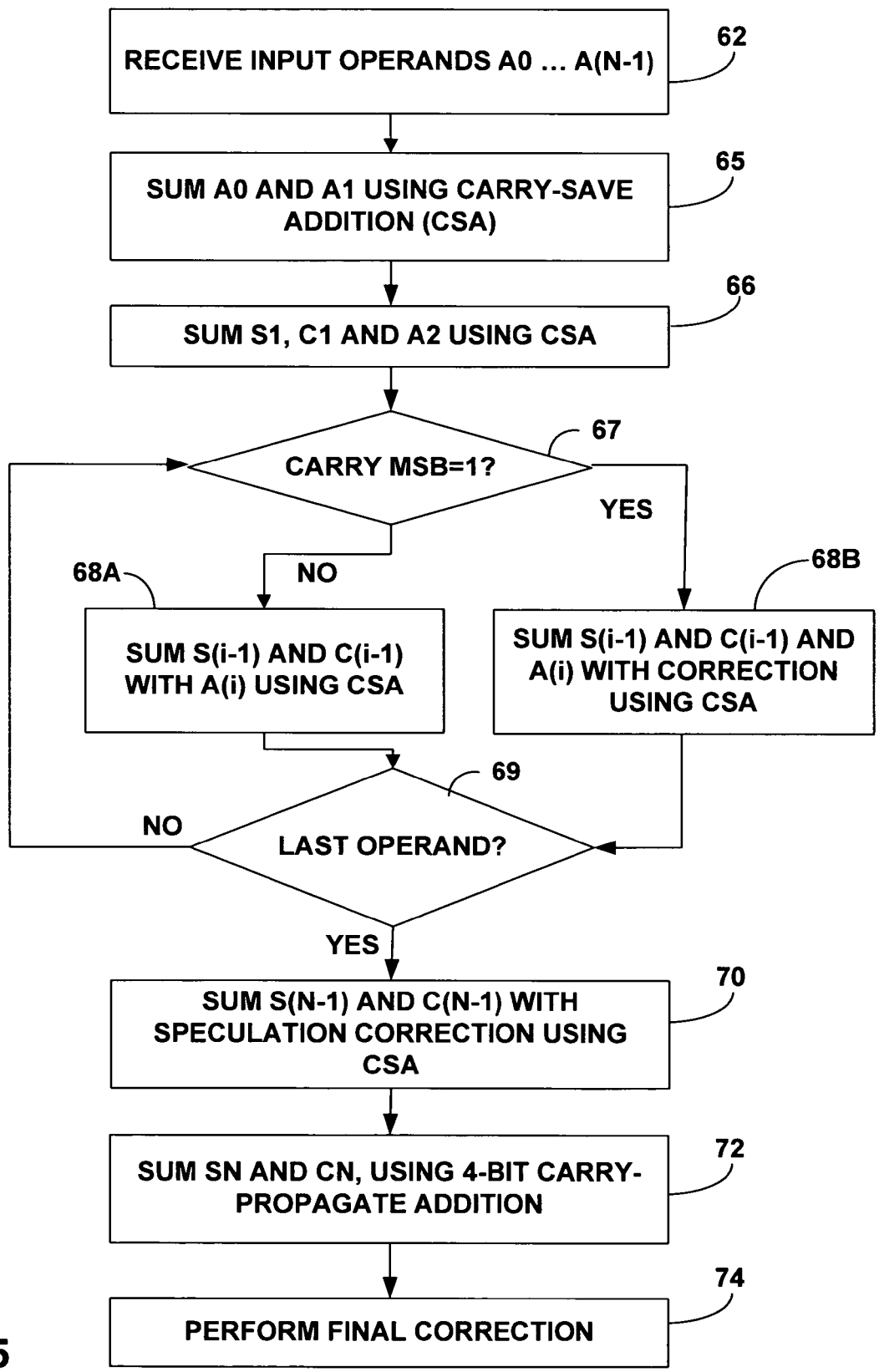
FIG. 5 is a flowchart illustrating exemplary operation of a multioperand decimal adder that performs decimal arithmetic using double correction speculation according to an embodiment of the invention.

FIG. 5 is a flowchart illustrating exemplary operation of a multioperand decimal adder, such as adder 50, that performs decimal arithmetic using double correction speculation in accordance with an embodiment of the invention.

First, adder 50 receives at least three operands A0-A(N−1) (62). For each digit, operand A0 is summed with the second operand A1 using binary carry-save addition (65). This produces a 4-bit sum, S1, and a 4-bit carry, C1. Next the third operand, A2, is summed with the second operand, S1 and C1 using binary carry-save addition, producing S2 and C2 (65). If the most significant bit of the carry from the addition of A0 and A1 is 0, then S2, C2 and A3 are summed using a carry-save adder to produce S3 and C3. (68A). If instead the most significant bit of the carry is 1, then S2, C2, (A3+6) are summed using a carry-save adder to produce S3 and C3. (68B).

A similar process continues for N−3 iterations (3≦i<N), until all input operands: A0, A1, . . . A(N−1), are added with appropriate correction values. For each iteration i, the most significant bit of the carry digit C(i−2)[4] is examined (67). If C(i−2)[4] is a logical one, then a carry-out has occurred and A(i)+6 is added to S(i−1) and C(i−1) using carry-save addition (68B) to produce S(i)+C(i)=S(i−1)+C(i−1)+(A(i)+6). Otherwise, no correction is needed and A(i) is added to S(i−1) and C(i−1) using carry-save-addition (68A) to produce S(i)+C(i)=S(i−1)+C(i−1)+A(i).

Once the process has completed for the final iteration, such that there are no more operands (69), a speculation correction is required. The speculation correction value is added to S(N−1) and C(N−1) based on C(N−1)[4] and C(N−2)[4] using Table 2 (70). Then, carry-propagate addition is performed to compress the sum, SN, and carry, CN, to obtain Z'=SN+CN using 4-bit carry-propagate addition (72). Last, the final sum is corrected back to a valid BCD digit, Z, and a digit carry, CO, is also produced (74). In word-wide decimal multioperand addition, Z represents the correct BCD digit having the same significance as the input operands and CO would be passed along to be included in the calculation of the next most significant digit of the total sum.

For illustrative purposes, pseudocode for the double speculative correction process in accordance with the invention is included below:

```
S1 + C1 = A0 + A1 + 0;              // using carry save addition
S2 + C2 = S1 + C1 + A2;             // using carry save addition
for (i = 3; i <N; i++)              // for each of the remaining
                                       operands
    if (C(i−2)[4]==1)   S(i) + C(i) = S(i−1) + C(i−1) + (A(i) + 6);
    else                S(i) + C(i) = S(i−1) + C(i−1) + (A(i) + 0);
SN + CN = S(N−1) + C(N−1) + SC;     // special correction from Table 2
Z' = SN +CN;                        // 4-bit carry-propagate addition
{CO, Z} = Z' + F;                   // F is the final correction from
                                       Table 1
```

Figure 6:
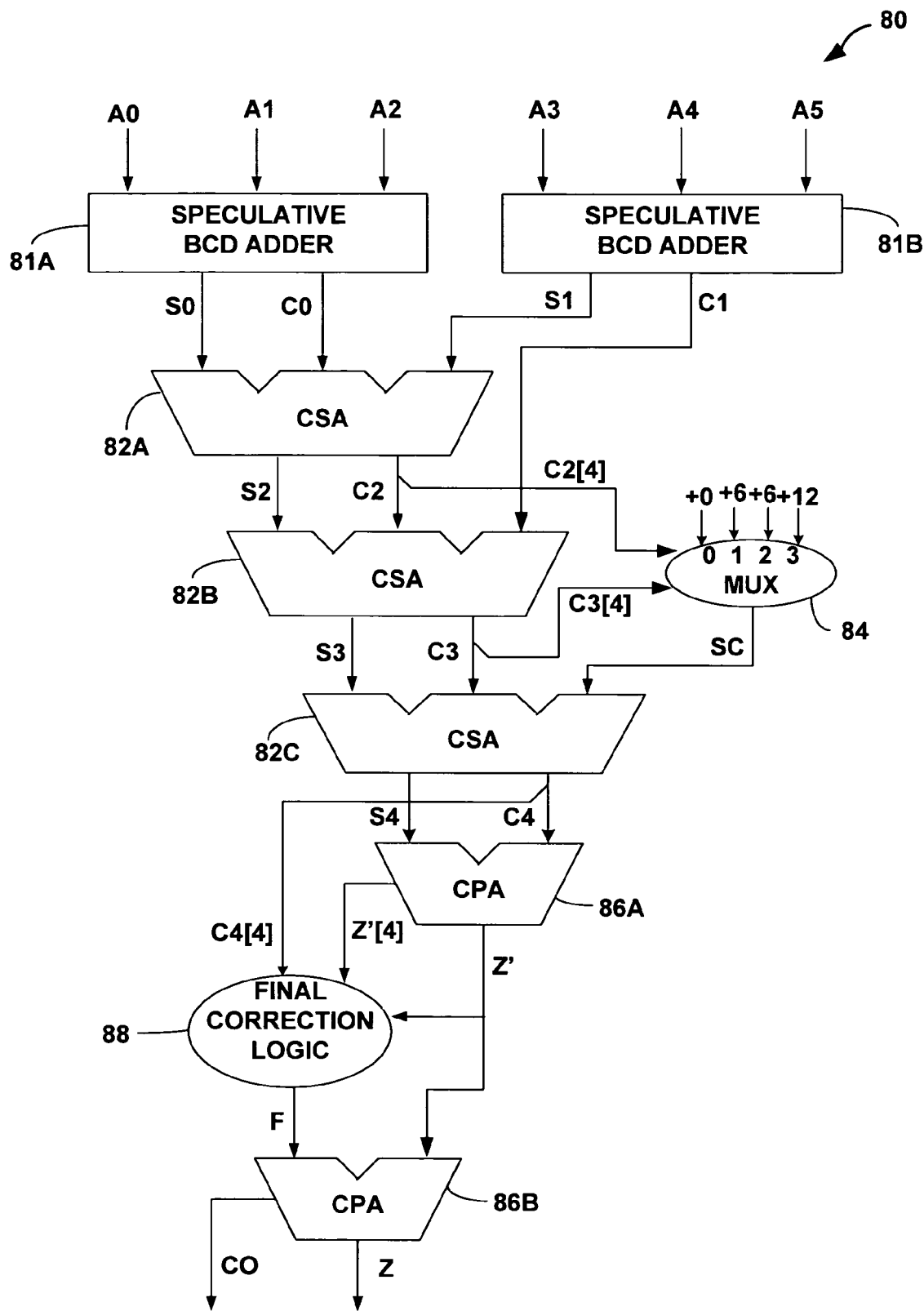
FIG. 6 is a block diagram illustrating parallel single-digit multioperand decimal adders according to an embodiment of the invention.

FIG. 6 is a block diagram illustrating an exemplary parallel multioperand decimal adder 80 that incorporates multiple speculative adders 81A and 81B (collectively, speculative adders 81). Parallel adder 80 also includes carry-save adders 82A, 82B and 82C (collectively, "CSAs 82") and carry-propagate adders 86A and 86B (collectively, "CPAs 86") Parallel adder 80 further comprises a multiplexer 84 and final correction logic 88.

Speculative adders 81 operate in parallel to produce partial sums S0 and S1 and partial carries C0 and C1. Either single or double correction speculation adders can be used as adders 81.

In this example, adder 80 receives six operands A0-A5, and speculative adders 81 each sum three of the operands as described above until the point where the speculation corrections are added (e.g., step 70 in FIG. 5). Then, the outputs of adders 81 (S0, S1, C0 and C1) are merged by CSA 82A and CSA 82B to produce S3 and C3. Next, CSA 82C adds a speculative correction SC selected by multiplexer 84. CPA 86A then compresses the S4 and C4 into a sum Z' and a carryout Z'[4]. Finally, logic 88 produces a final correction F in accordance with Table 1, which is added by CPA 86B to produce a BCD digit sum, Z and a carry-out, CO.

In this embodiment, parallel adder 80 comprises exactly two speculative adders 81 operating in parallel. In other embodiments parallel adder 80 may have additional speculative adders operating in parallel, but the benefits of using more adders in parallel are offset by the costs of merging the results. As illustrated in FIG. 6, merging the results of parallel adders 81 can be accomplished using three carry-save additions. With P parallel adders, there are 3×⌈log₂(P)⌉ extra carry-save additions on the critical path.

Embodiments of a 1-digit, N-operand Parallel Correction Speculation Adder composed of P parallel adders requires N 4-bit carry-save adders, (N−3) 4-bit 2:1 multiplexers, (N−3) 2-level combinational logic blocks to find A(i)+6, (2P) 4-bit carry-propagate adders, P 4-level combinational logic blocks to select F for each parallel adder, and 3(P−1) carry-save adders plus (P−1) 4-level correction logic blocks to merge results. Its critical path is ⌈N/P⌉ carry-save additions, one 4-bit 2:1 multiplexer delay, two 4-bit carry-propagate additions, and 4 levels of logic to implement speculative correction. Merging the results requires 3×⌈log₂(P)⌉ carry-save additions and 4×⌈log₂(P)⌉ levels of logic.

For ease of illustration, adder 80 is shown as capable of summing single digit operands. However, adder 20C may also comprise additional parallel adders and a word-wide decimal carry-propagate adder (CPA) and be capable of adding multiple digit BCD operands. Word-wide decimal multioperand addition is described in greater detail in the description of FIG. 8.

Figure 7:
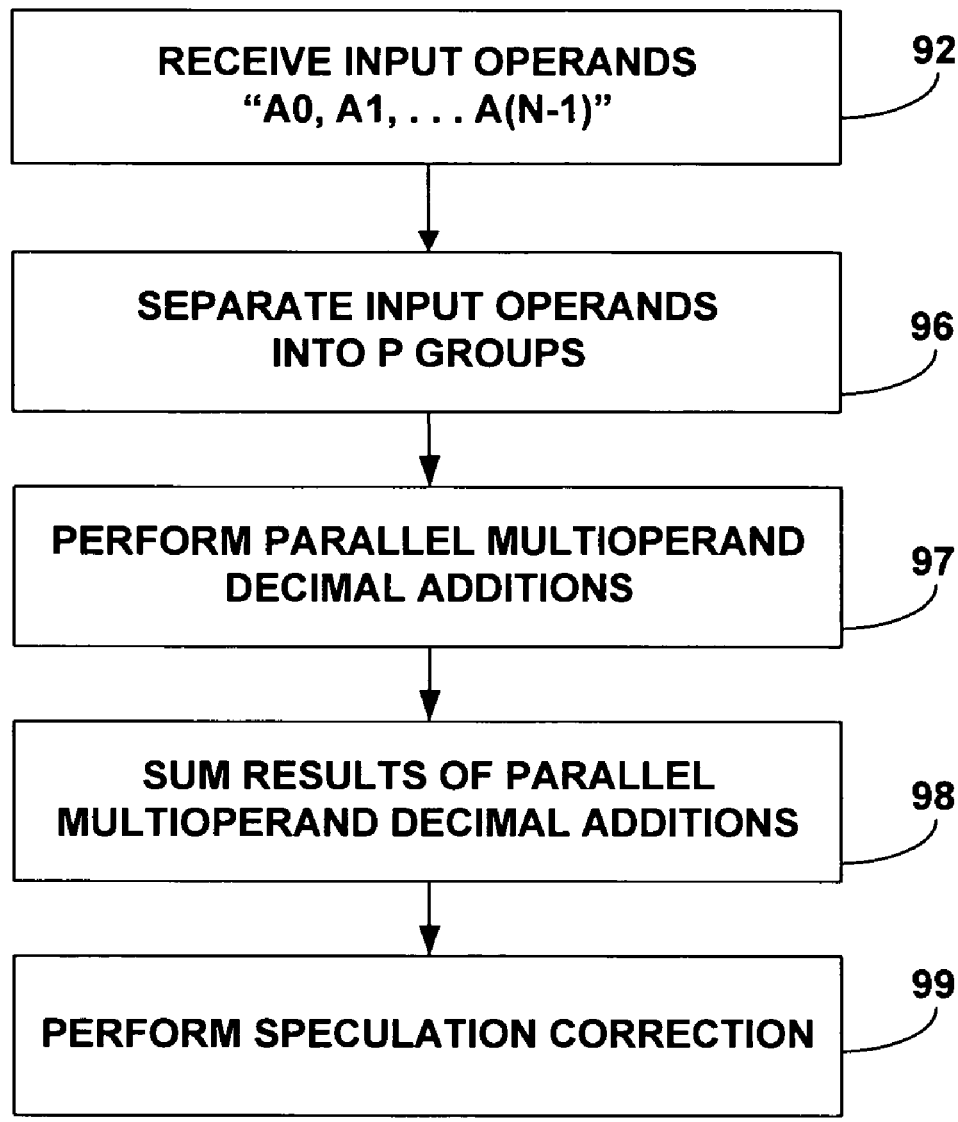
FIG. 7 is a flowchart illustrating exemplary operation of parallel multioperand decimal adders according to an embodiment of the invention.

FIG. 7 is a flowchart illustrating exemplary operation of a parallel multioperand decimal adder according to an embodiment of the invention. First, the multioperand decimal adder receives at least four operands (92). Next, the input operand digits are divided in P 4-bit groups, where P equals the number of speculative adders being used in parallel (96). Speculative addition, e.g., single or double speculative addition, is then used to produce P partial sums and partial carries, corresponding to one partial sum and partial carry for each speculative adder (97). The sums and carries from each speculative adder are then merged using carry-save addition (98). After the sums and carries are merged, another correction is needed to correct for the carry-outs for which are currently unaccounted. Then, speculation correction steps are taken, and a CPA compresses the sum and carry produced from step 98, followed by the addition of the addition of a final correction factor F in accordance with Table 1 (99).

Figure 8:
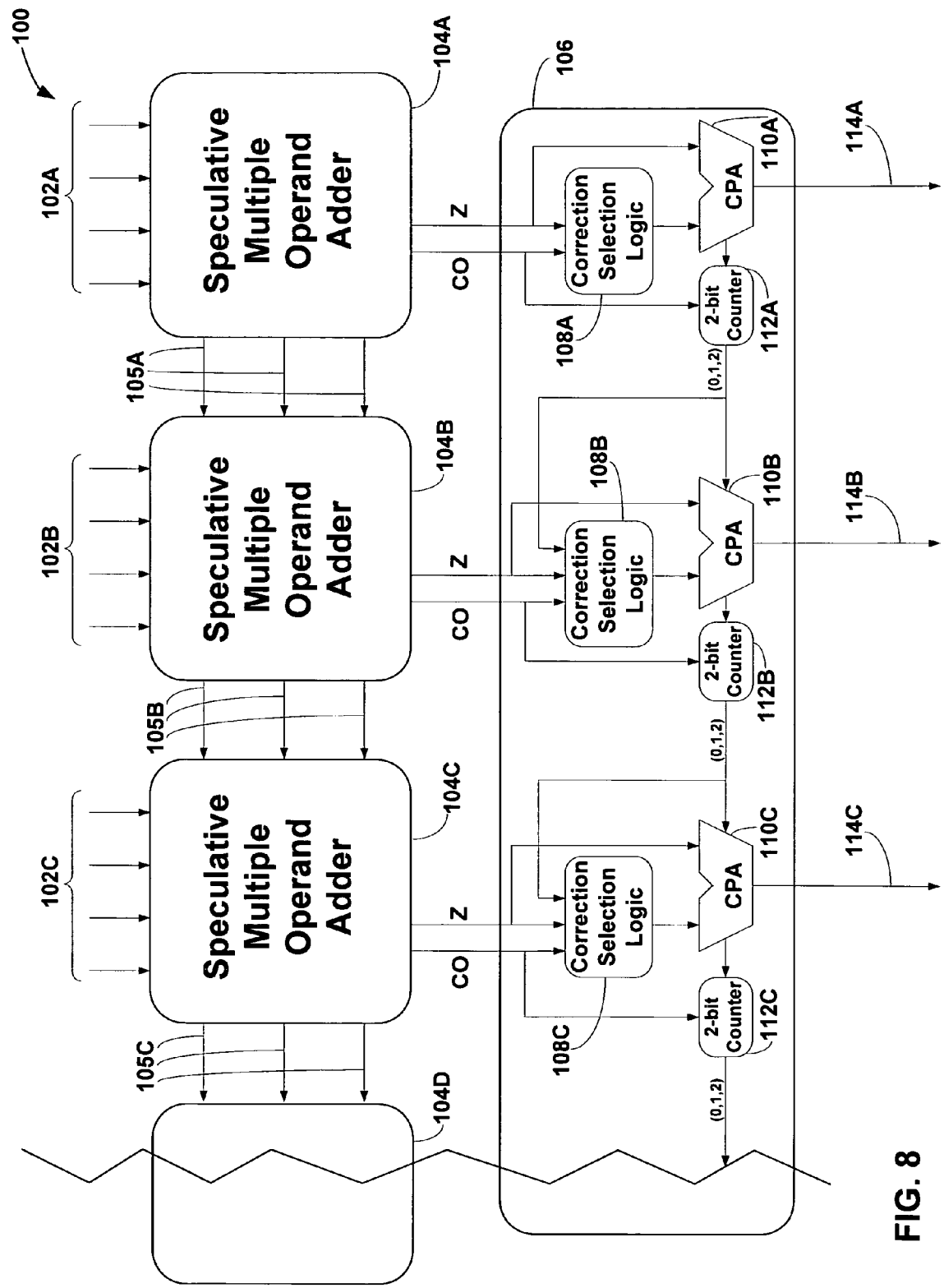
FIG. 8 is a block diagram illustrating word-wide binary coded decimal addition with speculative adders according to an embodiment of the invention.

FIG. 8 is a block diagram illustrating a portion of an exemplary word-wide decimal adder 100 that uses 1-digit (4-bit) speculative multioperand adders 104A, 104B and 104C, (collectively, "adders 104") and a word-wide decimal carry-propagate adder 106. Word-wide decimal carry-propagate adder 106 includes correction logic 108, a 2-bit counter 112 and a carry-propagate adder 110 for each of adders 104.

Each of multioperand speculative adders 104 may be any of the 1-digit (4-bit) multioperand speculative adders described above in reference to FIGS. 2, 4 and 6. Each of multioperand speculative adders 104 adds different digits of the input operands 102. The most significant bit of each carry digit, C(i)[4], becomes the least significant bit of the next more significant carry digit, which is known an inter-digit carry. FIG. 8 shows inter-digit carries 105A, 105B and 105C. For example, adder 104A outputs inter-digit carries 105A to adder 104B. FIG. 8 illustrates a portion of word-wide multioperand decimal adder 100 that is composed of M 1-digit speculative decimal multioperand adders 104 operating in parallel and feeding carries from one digit to the next more significant digit, where M equals the number of digits in each of operands 102. The 4-bit sum and 1-bit carry digits produced by the 1-digit multioperand adders 104 are fed into a word-wide decimal carry-propagate adder 106 to obtain the final result, digits 114A, 114B and 114C.

For example, logic 108A receives a sum, Z and a carry-out, CO from adder 104A. Logic 108A then determines if Z is greater than nine, which would require a binary to BCD correction of +6. Next, CPA 110A adds Z with the correction from logic 108A to produce a digit sum 114A and a 1-bit carry if required. 2-bit counter 112A receives a 1-bit carry from each of the C0 and CPA 110A, which are passed to CPA 110B for determining the digit sum 114B. This process is repeated within word-wide decimal carry-propagate adder 106 for each sum, Z and carry-out, CO produced by adders 104.

Figure 9:
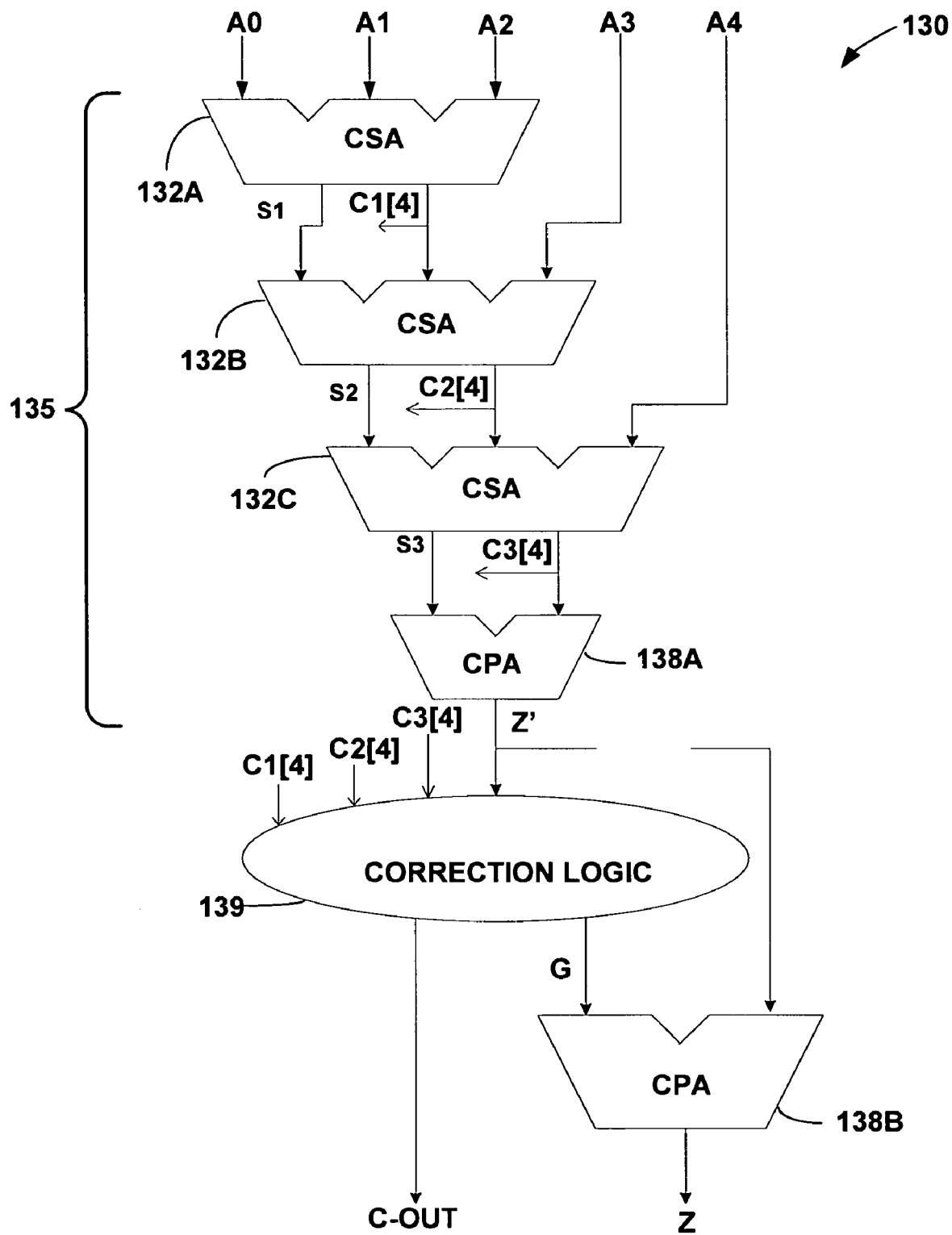
FIG. 9 is a block diagram illustrating exemplary operation of a single-digit non-speculative multioperand decimal adder that performs decimal arithmetic according to an embodiment of the invention.

FIG. 9 is a block diagram illustrating one embodiment of a non-speculative multioperand decimal adder 130 according to an embodiment of the invention. Specifically, FIG. 9 shows a single-digit, non-speculative multioperand decimal adder 130 that uses a binary CSA tree 135 for m ultioperand decimal addition according to an embodiment of the invention. Adder 130 includes carry-save adders 132A, 132B and 132C (collectively, "CSAs 132"). Adder 130 also includes carry-propagate adders 138A and 138B, (collectively, "CPAs 138") and carry correction and generation logic 139.

Non-speculative adder 130 sums BCD input operands A0, A1, A2, A3 and A4 in a binary carry-save tree that includes CSAs 132 that passes carries, C(i)[4] along each level from lower significant digits to more significant digits. In the example of FIG. 9, five BCD operand digits A0-A4 are added using binary carry-save tree 135 and a 4-bit CPA 138A. The result is a 5-bit binary sum, z', produced by CPA 138A and three intermediate carry-outs (C1[4], C2[4], and C3[4]).

The sum and carry-outs from the carry-save adder tree 135 are fed into correction logic 139, which includes combinatorial logic to produce a decimal sum correction and additional carry-outs, if needed. Specifically, a correction value of six needs to be added for each carry-out generated in the binary CSA tree 135. Thus, correction logic 139 produces a correction value G that is a multiple of six. Thus, the correction digit is always even and a 3-bit CPA is used. The correction digit, G, and the lower four bits of the binary sum, Z'[3:0], are passed through 1-digit CPA 138B to produce the correct BCD sum, Z. Correction logic 139 ensures that the final sum digit, Z, is a valid BCD digit and produces the additional carries, C-OUT, for the next most significant digit. For example, adding 8+2+6+5+3=24 gives C1[4]=0, C2[4]=0, C3[4]=1, and Z'=01000. Carry and correction generation logic 139 produces a correction of G=6×2 (mod 16)=12=1100, and C-OUT=01. Since 1000+1100=10100, the proper BCD representation of 24 is produced.

Figure 10:
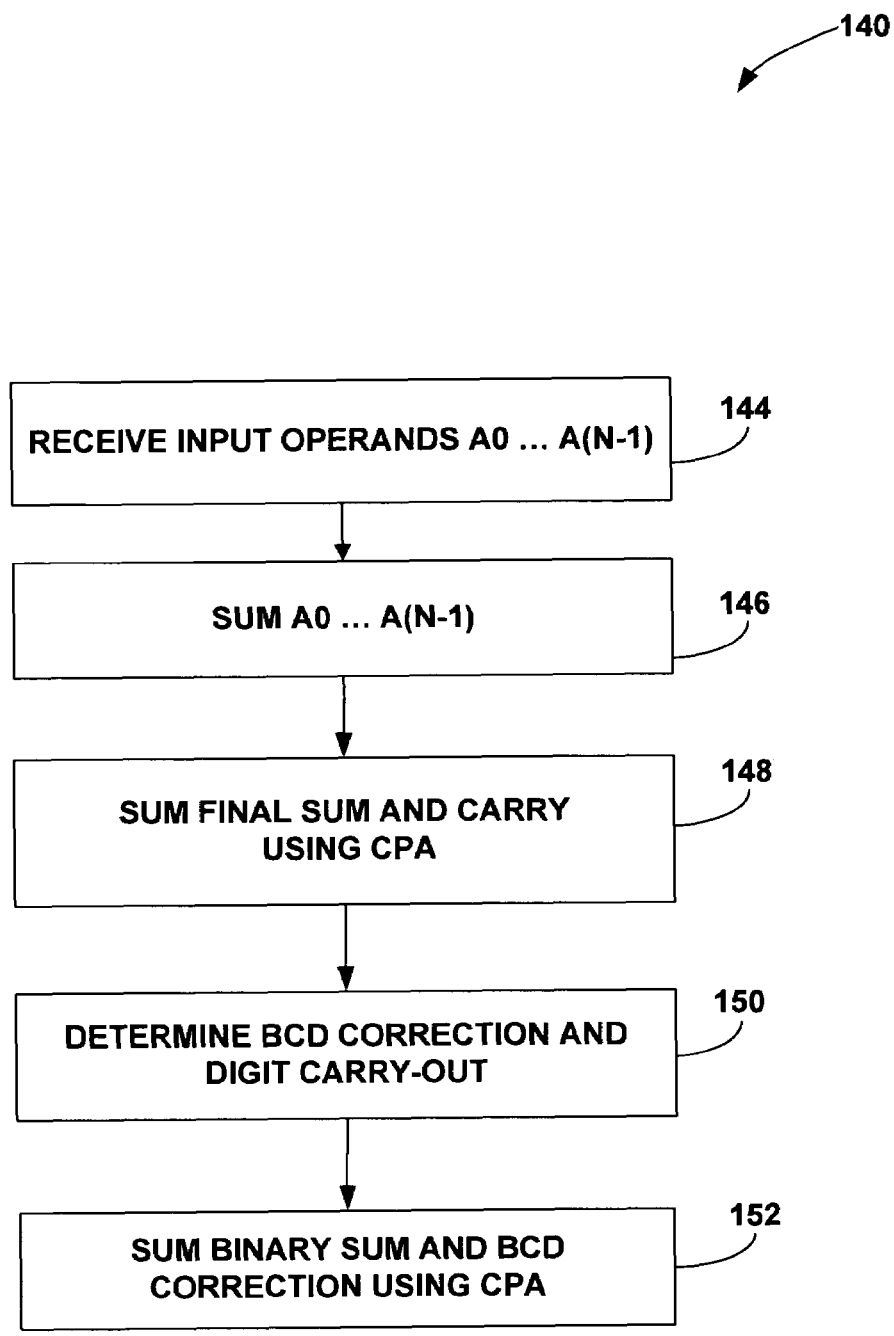
FIG. 10 is a flowchart illustrating exemplary operation of a non-speculative multioperand decimal adder that performs decimal arithmetic according to an embodiment of the invention.

The exemplary non-speculative adder 130 shown in FIG. 10 can sum digits for up to five operands A0-A5. However, other embodiments of non-speculative adders in accordance with the invention may be implemented to sum more or less operands. A 1-digit, N-operand non-speculative adder requires (N−2) 4-bit carry-save adders, one 4-bit carry-propagate adder, one five-level combinational logic block to generate the carry-out and correction digits (for up to sixteen input operands), and one three-bit carry-propagate adder to add the correction digit to the binary sum. Its critical delay path consists of roughly $\lfloor \log_{3/2}(N-1) \rfloor$ carry-save additions, one 4-bit carry-propagate addition, one 5-level logic block, and one 3-bit carry-propagate addition. Unlike the correction speculation adders shown in FIGS. 2, 4 and 6, which use an array of binary carry-save adders and have a linear delay, non-speculative adders use a tree of binary carry-save adders and have logarithmic delay.

A word-wide BCD non-speculative adder may use decimal carry-lookahead logic. The addition is can be done using a variation of direct decimal addition, in which each 1-digit adder takes a sum and carry digit and produces digit propagate and generate signals. The digit propagate and generate signals are then sent to carry-lookahead logic, which is used to compute digit carries in parallel. Finally, the digit carries and additional carry-lookahead logic within each digit are used to quickly produce the sum digits. The word-wide adder is less complex than the word-wide decimal carry-propagate adder 106 in FIG. 8, since only a 1-bit carry into each digit is necessary.

FIG. 10 is a flowchart illustrating exemplary operation of a non-speculative multioperand decimal adder, such as adder 130 of FIG. 9, that performs decimal arithmetic according to an embodiment of the invention. First, adder 130 receives operands A0-AN (142). Adder 140 then sums the input operands in a binary carry-save tree, passing carries generated along the way to the more significant digits (146). Adder 140 then produces a binary sum from the results of the binary carry-save tree using carry-propagate addition (148). This sum and carry-outs from the carry-propagate addition are fed into combinational correction logic, which produces a decimal correction and additional carry-outs, if needed (150). After the decimal correction value is produced, the sum produced in step 148 is added to the decimal correction using carry-propagate addition to produce a final resultant decimal digit (152).

Simulation Results

The multioperand decimal adders described herein have been modeled in Verilog and simulated extensively. From the Verilog models, multioperand decimal adders were synthesized using a 0.18-micron CMOS standard cell library. When performing synthesis, the designs were optimized for area. Both 4-bit (1-digit) and 32-bit (8-digit) multioperand decimal adders were constructed for: (1) single correction speculation, (2) double correction speculation, (3) parallel correction speculation using two double correction speculation adders, (4) parallel correction speculation using four double correction speculation adders, and (5) non-speculative addition. Each 32-bit decimal multioperand adder was constructed from eight 1-digit multioperand decimal adders, followed by a word-wide decimal carry-lookahead adder, as described above. Each 32-bit binary multioperand adder was constructed using a linear array or tree of carry-save adders, followed by a word-wide binary carry-lookahead adder.

For comparison, binary multioperand carry-save adders were built to evaluate the additional cost of performing multioperand decimal addition. One set of binary multioperand adders was designed to be similar to the Correction Speculation Adders and contains a linear array of binary carry-save adders. The other set was designed to be similar to the Non-Speculative Adders and uses a tree of binary carry-save adders. Both types of binary multioperand adders use the same word-wide carry-propagate adder. In the word-wide carry-propagate adder, two levels of carry-lookahead logic are implemented. The first level produces group generate and propagate signals for 4-bit blocks. The second level uses the group generate and propagate signals to obtain the carries into each 4-bit block.

Figure 11:
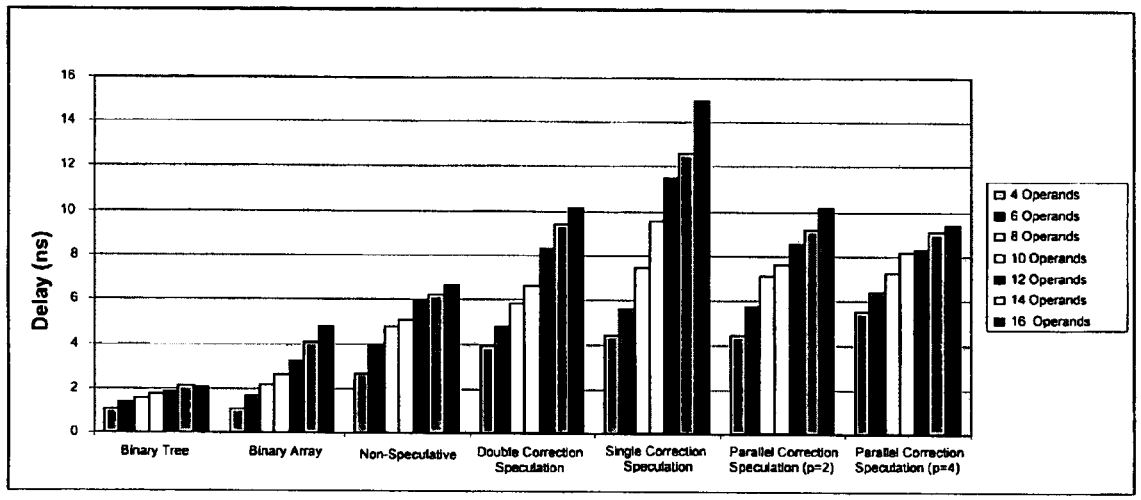
FIGS. 11-14 are graphs showing delay and area of multioperand decimal adders in accordance with embodiments of the invention.
Figure 12:
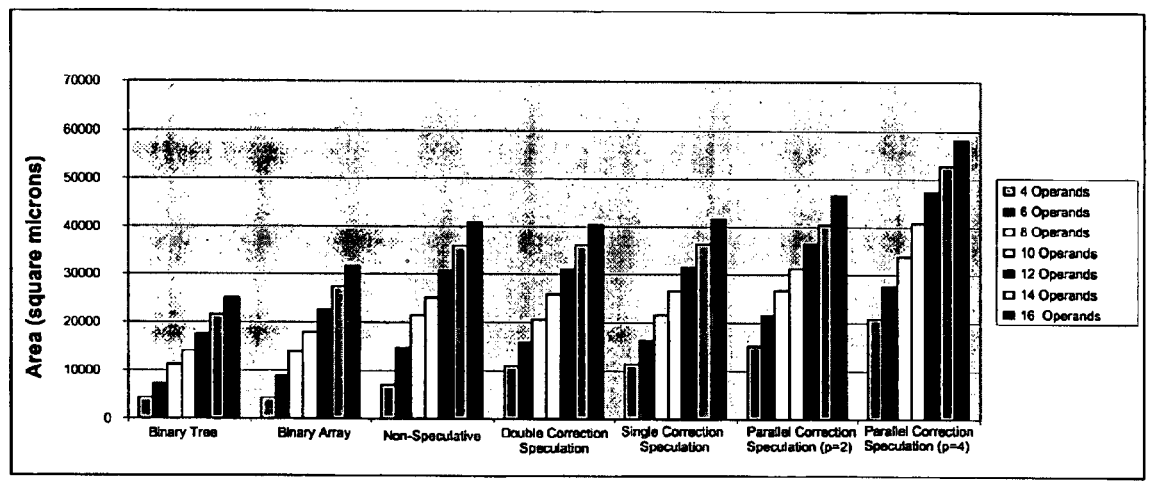
Figure 13:
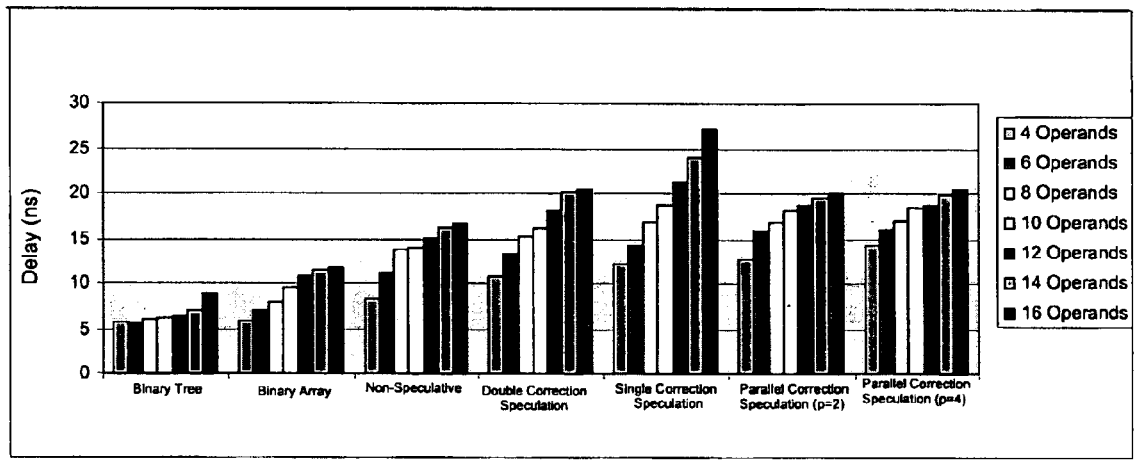
Figure 14:
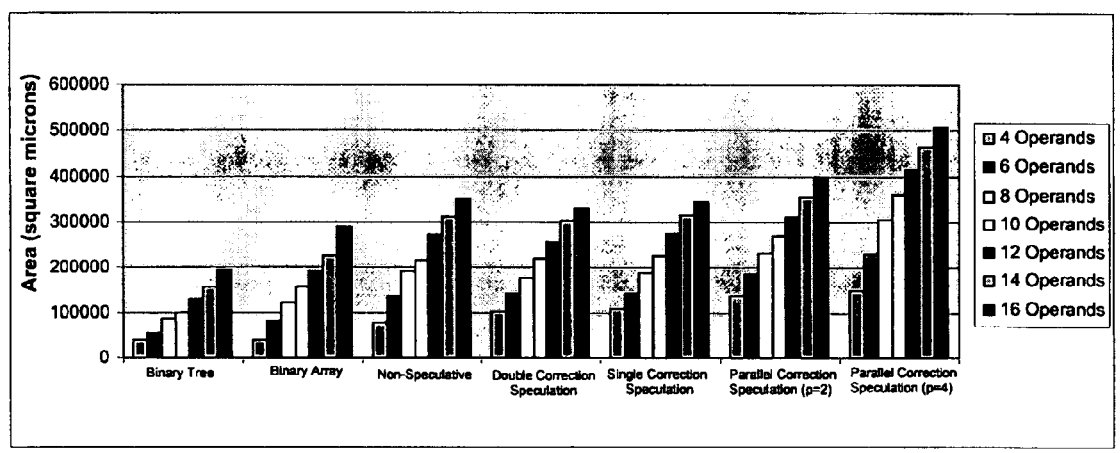

Overall, seven different adder types for each of 4, 6, 8, 10, 12, and 16 operands were constructed for both 4-bit and 32-bit operands for a total of 94 different multioperand adders. The delay and area for the constructed 4-bit multioperand adders are shown in FIGS. 11 and 12, respectively. The delay and area for the constructed 32-bit adders are shown in FIGS. 13 and 14, respectively. Similar conclusions can be reached using either the 4-bit or the 32-bit multioperand adder results. The 32-bit multioperand adder results, which show the overall area and delay due to processing multiple digits and performing word-wide carry-lookahead addition, are discussed throughout the rest of this section.

In reference to FIG. 13, for all decimal multioperand adders that speculate corrections and also the binary array multioperand adders, the delay increases linearly with the number of input operands. The difference in delay between double and single correction speculation adders grows with more input operands because the multiplexer delays to select $A(i)$ or $A(i)+6$ are hidden in the double correction speculation adders. The parallel correction speculation adders have a larger overhead (from result merging) than the other adders. This is seen in longer relative delays for fewer input operands. As the number of input operands increases, the difference in delay is less, because the Parallel Correction Speculation Adders operate on two or four sets of operands in parallel.

The non-speculative adders have lower delays than all of the other decimal multioperand adders. One advantage of the non-speculative adders is that the delay grows logarithmically, rather than linearly, since operands are added using a tree of binary carry-save adders. Their logarithmic delay may be particularly useful when a large number of input operands are added. Although the area for the 32-bit non-speculative decimal adder, single correction speculation decimal adder, and double correction speculation adder are similar, the double correction speculation adders have the lowest average area. This makes the double correction speculation adders desirable when area is more important than delay. The parallel correction speculation adders require more area than the other adders due to the overhead of merging the results.

The areas and delays for binary adders are shown for comparison. The cost of performing multioperand decimal addition versus multioperand binary addition is calculated by comparing the non-speculative adders, which have the smallest delay and small overall area, to the binary tree adders. The non-speculative adders have 1.44 to 2.34 times more delay and 1.61 to 2.03 times more area than the binary tree adders.

Various embodiments of the invention have been described. These and other embodiments are within the scope of the following claims.

The invention claimed is:

1. A method comprising:
   receiving, in parallel, at least three decimal operands wit a decimal multioperand adder circuit of a processing circuit;
   performing binary carry-save addition with the decimal multioperand adder circuit to produce a set of sum bits and a set of carry bits by:
   performing a binary carry-save addition with at least two of the decimal operands,
   correcting one of the other decimal operands to produce a corrected version of the other one of the operands in parallel to performing the binary carry-save addition of the at least two operands, and
   selectively adding a result of the binary carry-save addition for the at least two operands with either the other one of the decimal operands or the corrected version of the other one of the operands based on a most significant bit of the carry bits to produce the set of sum bits and the set of carry bits; and
   outputting a decimal result based on the set of sum bits and the set of carry bits, 2. The method of claim 1, wherein performing binary carry-save addition comprises performing binary carry-save addition with at least three binary carry-save adder circuits within the decimal adder circuit to produce the set of sum bits and the set of carry bits.

3. The method of claim 1, wherein performing binary carry-save addition comprises performing correction speculation to produce the set of sum bits and carry bits.

4. The method of claim 1, wherein performing binary carry-save addition comprises performing single correction speculation to produce the set of sum bits and carry bits.

5. The method of claim 4, wherein performing single correction speculation comprises:
   (a) performing the binary carry-save addition for the at least two operands by adding a digit of a first one of the operands with a digit of a second one of the operands with a first binary carry-save adder circuit to produce an intermediate sum and an intermediate carry;
   (b) correcting the other one of the decimal operands by adding a digit of a third one of the operands with a correction value in parallel with step (a) to produce a corrected version of the third one of the operands; and
   (c) selectively adding either the other one of the decimal operands or the corrected version of the other one of the operands by selectively adding, based on a most significant bit of the intermediate carry from step (a), either the third one of the operands or the corrected version to the intermediate sum of step (a) with a second binary carry-save adder circuit.

6. The method of claim 1, wherein performing binary carry-save addition comprises performing double correction speculation to produce the set of sum bits and carry bits.

7. The method of claim 6, wherein performing double correction speculation comprises:
   (a) performing the binary carry-save addition for the at least two operands by:
      (a1) adding a digit of a first one of the operands with a digit of a second one of the operands with a first binary carry-save adder circuit to produce an intermediate sum S1 and an intermediate carry C1, and
      (a2) adding the intermediate sum S1 and the intermediate carry C1 to a digit of a third one of the operands with a second binary carry-save adder circuit to produce an intermediate sum S2 and an intermediate carry C2;
   (b) correcting the other one of the decimal operands by adding a digit of a fourth one of the operands with the correction value in parallel with steps (a1) and (a2) to produce a corrected version of the fourth one of the operands; and
   (c) selectively adding either the other one of the decimal operands or the corrected version of the other one of the operands by selectively adding, based on a most significant bit of the intermediate carry C2, either the fourth one of the operands or the corrected version to the intermediate sum S2 and intermediate carry C2 with a third binary carry-save adder circuit.

8. The method of claim 1, wherein performing binary carry-save addition comprises performing parallel correction speculation with a plurality of speculative adder circuits operating in parallel on subsets of the operands to produce the set of sum bits and carry bits.

9. The method of claim 1,
   wherein performing binary carry-save addition comprises:
   (a) adding a first subset of the operands with a first speculative adder circuit to produce an intermediate sum S0 and an intermediate carry C0; and
   (b) adding a second subset of the operands with a second speculative adder circuit in parallel with step (a) to produce an intermediate sum S1 and an intermediate carry C1, wherein the first and second speculative adders circuits each performs the binary carry-save addition with at least two of the decimal operands, the correction and selective addition to produce the intermediate sums S0 and S1 and intermediate carries C1 and C2, and wherein outputting a decimal result comprises performing carry-save addition to produce the decimal result based on the intermediate sums S0 and S1 and the intermediate carries C0 and C1.

10. The method of claim 1, wherein receiving at least three decimal operands comprises receiving N operands, where N≧3, and wherein performing binary carry-save addition comprises performing binary carry-save addition using N binary carry-save adder circuits to produce the sum digit SN and the carry digit CN, and wherein outputting a decimal result comprises producing the decimal result based on the sum digit SN and the carry digit CN.

11. The method of claim 10, further comprising:

performing carry-propagate addition to add the sum digit SN and the carry digit CN to produce an intermediate sum Z'; and adding a correction value F to the intermediate sum Z' using carry-propagate addition to produce the decimal result.

12. A processing circuit comprising a multi-operand decimal adder circuit that:

receives, in parallel, at least three decimal operands; and performs binary carry-save addition on the operands producing a decimal result by:

performing a binary carry-save addition with at least two of the decimal operands, correcting one of the other decimal operands producing a corrected version of the other one of the operands in parallel to performing the binary carry-save addition of the at least two operands, and selectively adding a result of the binary carry-save addition for the at least two operations with either the other one of the decimal operands or the corrected version of the other one of the operands based on a most significant bit of the carry bits to produce the set of sum bits and the set of carry bits.

13. The processing circuit of claim 12, wherein the multi-operand decimal adder circuit comprises:

at least three binary carry-save adder circuits to process the decimal operands and produce an intermediate sum and an intermediate carry; and at least one carry propagate adder circuit to produce the decimal result based on the intermediate sum and the intermediate carry.

14. The processing circuit of claim 12, wherein the multi-operand decimal adder circuit comprise a speculative multi-operand adder circuit that performs correction speculation to produce the decimal result.

15. The processing circuit of claim 12, wherein the speculative multi-operand adder circuit performs single correction speculation to produce the decimal result.

16. The processing circuit of claim 12, wherein the multi-operand decimal adder circuit comprises:

a first binary carry-save adder circuit that performs the binary carry-save addition for the at least two operands by adding s a digit of a first one of the operands with a digit of a second one of the operands to produce a first intermediate sum and a first intermediate carry;

a correction circuit that performs the correction in parallel with the first binary carry-save adder to produce a corrected version of a third operand;

a multiplexer circuit to selectively output, based on a most significant bit of the first intermediate carry, either the third one of the operands or the corrected version of the third operand based on the first intermediate carry; and a second binary carry-save adder circuit that performs the selective addition to add the first intermediate sum digit and the first intermediate carry digit with the output of the multiplexer circuit, 17. The processing circuit of claim 12, wherein the multi-operand decimal adder circuit performs double correction speculation to produce the decimal result.

18. The processing circuit of claim 12, wherein the multi-operand decimal adder circuit comprises:

a first binary carry-save adder circuit that performs the binary carry-save addition for the at least two operands by adding a digit of a first one of the operands with a digit of a second one of the operands to produce a first intermediate sum S1 and a first intermediate carry C1;

a second binary carry-save adder circuit tat further performs the binary carry-save addition for the at least two operands by adding the intermediate sum S1 and the first intermediate carry C1 with a digit of a third one of the operands to produce a second intermediate sum S2 and a second intermediate carry C2;

a correction circuit tat performs the correction in parallel the first binary carry-save adder circuit and the second binary carry-save adder circuit that outputs a corrected version of a fourth operand;

a multiplexer circuit to selectively output either the fourth one of the operands or the corrected version of the fourth operand based on a most significant bit of the second intermediate carry C2; and a third binary carry-save adder circuit to add the output from the multiplexer circuit with the second intermediate sum S2 and the second intermediate carry C2 based on a logical value of the first intermediate carry C1.

19. The processing circuit of claim 14, wherein the multi-operand decimal adder circuit comprises:

a first speculative adder circuit to add a first subset of the operands to produce a first inter intermediate sum S1;

a second speculative adder circuit in parallel with the first speculative adder circuit to add a second subset of the operands to produce a second inter intermediate sum S2, wherein the first and second speculative adder circuits each performs the binary carry-save addition with at least two of the decimal operands, the correction and selective addition to produce the intermediate sums S0 and S1; and at least one carry propagate adder to output the decimal result as a function of the intermediate sums S1 and S2.

20. A method comprising:

(a) receiving at least three decimal operands with a decimal multioperand adder circuit of a processing circuit;

(b) adding a digit of a first one of the operands with a digit of a second one of the operands with a first binary carry-save adder circuit to produce an intermediate sum and an intermediate carry;

(c) adding a digit of a third one of the operands with a correction value in parallel with the execution of step (b) to produce a corrected version of the third one of the operands; and (d) selectively adding either the third one of the operands or the corrected version to the intermediate sum of step (b)

with a second binary carry-save adder circuit based on the most significant bit of the intermediate carry from step (b).

21. The method of claim 20, further comprising (e) outputting a decimal result based on another intermediate sum and another intermediate carry produced by the selective addition of step (d).

22. A multi-operand decimal adder circuit comprising:
a plurality of input circuits receiving a plurality of decimal operands;
a first binary carry-save adder circuit that adds a digit of a first one of the operands with
a digit of a second one of the operands to produce a first intermediate sum and a first intermediate carry;
a correction circuit executing in parallel to the first binary carry-save adder circuit producing a corrected version of a third operand;
a multiplexer circuit selectively outputting either the third one of the operands or the corrected version of the third operand based on the most significant bit of the first intermediate carry; and
a second binary carry-save adder circuit to add the first intermediate sum and the first intermediate carry with the output of the multiplexer circuit.

23. The multi-operand decimal adder circuit of claim 22, further comprising a plurality of carry propagate adder circuits to output a decimal result based on a sum and a carry produced by the second binary carry-save adder circuit.

24. A method comprising:
(a) receiving at least four decimal operands with a decimal adder circuit of a processing circuit;
(b) adding a digit of a first one of the operands with a digit of a second one of the operands with a first binary carry-save adder circuit to produce an intermediate sum S1 and an intermediate carry C1;
(c) adding the intermediate sum S1 and the intermediate carry C1 with a digit of a third one of the operands with a second binary carry-save adder circuit to produce an intermediate sum S2 and an intermediate carry C2;
(d) adding a digit of a fourth one of the operands with a correction value in parallel with performance of steps (b) and (c) to produce a corrected version of the fourth one of the operands; and
(e) selectively adding either the fourth one of the operands or the corrected version to the intermediate sum S2 and the intermediate carry C2 with a third binary carry-save adder circuit based on the most significant bit of the intermediate carry C1.

25. The method of claim 24, further comprising (f) outputting a decimal result based on a second intermediate sum and a second intermediate carry produced by the selective addition of step (e).

26. A multi-operand decimal adder circuit comprising:
a plurality of input circuits to receive a plurality of decimal operands;
a first binary carry-save adder circuit that adds a digit of a first one of the operands with a digit of a second one of the operands to produce a first intermediate sum S1 and a first intermediate carry C1;
a second binary carry-save adder circuit that adds the intermediate sum S1 and the first intermediate carry C1 with a digit of a third one of the operands to produce a second intermediate sum $2 and a second intermediate carry C2;
a correction circuit in parallel the first binary carry-save adder circuit and the second binary carry-save adder circuit that outputs a corrected version of a fourth operand;
a multiplexer circuit selectively outputting either the fourth one of the operands or the corrected version of the fourth operand based on the second intermediate carry C2; and
a third binary carry-save adder circuit adding the output from the multiplexer with the second intermediate sum $2 and the second intermediate carry C2 based on a logical value of the most significant bit of the first intermediate carry C1.

27. The multi-operand decimal adder circuit of claim 26, further comprising a plurality of carry propagate adder circuit to receive an intermediate sum S3 and an intermediate carry C3 produced by the third binary carry-save adder circuit and output a decimal result.

28. A method comprising:
(a) receiving a plurality of decimal operands with a decimal adder circuit of a processing circuit;
(b) adding a first subset of the operands with a first decimal speculative adder circuit to produce an intermediate sum S0 and an intermediate carry C0;
(c) adding a second subset of the operands with a second decimal speculative adder circuit in parallel with step (b) to produce an intermediate sum S1 and an intermediate carry C1,
wherein the first and second speculative adder circuits each performs binary carry-save addition by:
performing a binary carry-save addition with at least two of the decimal operands,
correcting one of the other decimal operands to produce a corrected version of the other one of the operands in parallel to performing the binary carry-save addition of the at least two operands, and
selectively adding a result of the binary carry-save addition for the at least two operations with either the other one of the decimal operands or the corrected version of the other one of the operands based on a most significant bit of the carry bits to produce the intermediate sums S0 and S1 and intermediate carries C0 and C1, respectively; and
(d) outputting a decimal result based on the intermediate sums S0 and S1 and the intermediate carries C0 and C1.

29. The method of claim 28,
wherein adding a first subset of the operands with a first binary speculative adder circuit comprises performing single correction speculation to add the first subset of the operands, and
wherein adding a second subset of the operands with a second binary speculative adder circuit comprises performing single correction speculation to add the second subset of the operands.

30. The method of claim 28,
wherein adding a first subset of the operands wit a first, binary speculative adder circuit comprises performing double correction speculation to add the first subset of the operands, and
wherein adding a second subset of the operands with a second binary speculative adder circuit comprises performing double correction speculation to add the second subset of the operands.

31. A multi-operand decimal adder circuit comprising:
a plurality of input circuits receiving a plurality of decimal operands;
a first speculative adder circuit adding a first subset of the operands to produce a first intermediate sum S1;

a second speculative adder circuit in parallel with the first speculative adder circuit adding a second subset of the operands to produce a second inter intermediate sum S2, wherein the first and second speculative adder circuits each performs binary carry-save addition by:

performing a binary carry-save addition with at least two of the decimal operands, correcting one of the other decimal operands to produce a corrected version of the other one of the operands in parallel to performing the binary carry-save addition of the at least two operands, and selectively adding a result of the binary carry-save addition for the at least two operations with either the other one of the decimal operands or the corrected version of the other one of the operands based on a most significant bit of the carry bits to produce the intermediate sums S0 and S1, respectively; and at least one carry propagate adder to output the decimal result as a function of the intermediate sums S1 and S2.

32. The multi-operand decimal adder circuit of claim 31, wherein the first speculative adder circuit and the second speculative adder circuit apply single correction speculation.

33. The multi-operand decimal adder circuit of claim 31, wherein the first speculative adder circuit and the second speculative adder circuit apply double correction speculation.

\* \* \* \* \*